United States Patent [19]

Baugh

[11] 3,840,704

[45] Oct. 8, 1974

[54] TIME DIVISION SWITCHING SYSTEM

[75] Inventor: Charles Richmond Baugh, Lincroft, N.J.

[73] Assignee: Bell Telephone Laboratories, Incorporated, Murray Hill, N.J.

[22] Filed: Oct. 11, 1973

[21] Appl. No.: 405,679

[52] U.S. Cl. .......... 179/15 AQ

[51] Int. Cl. .......... H04j 3/00

[58] Field of Search .......... 179/15 AQ

[56] References Cited

UNITED STATES PATENTS 3,760,103 9/1973 Condon .......... 179/15 AQ 3,761,619 9/1973 Pommerening .......... 179/15 AQ

*Primary Examiner*—Ralph D. Blakeslee

*Attorney, Agent, or Firm*—W. Ryan

[57] ABSTRACT

A time-division switching system is disclosed in which interleaved control memories are utilized to control pairs of switching modules in an implementation of slipped-mirror-image call processing apparatus and methods. The implementation provides, among other things, a simplified path hunt arrangement, uniformity of call setup, maintenance and release. The implementation also minimizes the amount of control memory and associated hardware required for call processing.

6 Claims, 8 Drawing Figures

| ADDRESS VALUE | | DATA OUTPUT | |
|---|---|---|---|
| DEC | BINARY | OUTPUT 1 | OUTPUT 2 |
| 0 | 000···00 | LEFT HALF OF LOC 0 | RIGHT HALF OF LOC 0 |
| 1 | 000···01 | RIGHT HALF OF LOC 0 | LEFT HALF OF LOC 0 |
| 2 | 000···10 | LEFT HALF OF LOC 1 | RIGHT HALF OF LOC 1 |
| 3 | 000···11 | RIGHT HALF OF LOC 1 | LEFT HALF OF LOC 1 |
| ⋮ | ⋮ | ⋮ | ⋮ |
| $2^n-2$ | 111···10 | LEFT HALF OF LOC $2^{n-1}-1$ | RIGHT HALF OF LOC $2^{n-1}-1$ |
| $2^n-1$ | 111···11 | RIGHT HALF OF LOC $2^{n-1}-1$ | LEFT HALF OF LOC $2^{n-1}-1$ |

TIME DIVISION SWITCHING SYSTEM

BACKGROUND OF THE INVENTION

1. Field of the Invention

This invention relates to digital time-division multiplex switching networks for use in telephone and similar communications systems comprising a plurality of time-division space-division switching modules wherein each switching module comprises an array of crosspoints and associated crosspoint control memories.

The current practice in telephone systems is to establish a solid connection between a calling and a called line via a path which is associated individually and uninterruptedly with the connection for the duration of the call. Thus a quantity of equipment, dependent upon the number of lines served and the expected frequency of service, is provided in a common pool from which portions may be chosen and assigned to a particular call. Such a system arrangement is referred to as "space division" in which privacy of conversation is assured by the division or separation of individual conversations in space.

In contrast, telephone systems have been developed which operate on a time-division basis in which a number of conversations share a single path. Privacy of conversations is assured in such systems by separation of individual conversations in time, i.e., a number of conversations share a common transmission facility by dividing the total available time of the facility equally among them. Thus each call is assigned to the common path for an extremely short but rapidly and periodically recurring interval, and the connection between any two lines in communication is completed only during these short intervals or time slots. Samples which retain essential characteristics of the voice or other signal are transmitted in these time slots and are utilized in the called line to reconstruct the original signal. Reception of signals of any complexity through such a time-division network is entirely satisfactory.

2. Background and Prior Art

H. Inose et al, in U.S. Pat. No. 3,461,242, issued Aug. 12, 1969, describe a time-division switching system in which a single control memory supplies signals to control the operation of corresponding matrix crosspoints in opposite halves of a network during a given time slot. Such an arrangement, sometimes called a mirror-image network, may be used to process bidirectional calls through the network, such processing including, for example, call setup, maintenance and release. Mirror-image control utilizes inherent network symmetry to facilitate such call processing. In particular, a recognition of network symmetry permits the amount of control memory required to set up bidirectional calls to be reduced. This result follows from the fact that whenever a first path through the network is known, the "symmetric mate" (mirror-image) of the path is also known. Thus a single control memory word may be utilized to control crosspoints in switching modules symmetrically located in a mirror-image network.

When processing calls in such a mirror-image network, however, symmetric, oppositely directed paths may in some instances be coincident or partially coincident. This typically requires the use of certain elements of switching equipment simultaneously for more than one communication path. As an example, one need only consider the case where a path and its symmetric mate are one and the same. In the example cited, virtually every switching device utilized in one direction of a bidirectional call would be simultaneously required for the oppositely directed calling path.

In an analog, two- or four-wire signaling system, a single path may be utilized for bidirectional communications because the analog waveform itself may be used to determine call direction. However, a single path cannot be used for simultaneous bidirectional communications in a digital time-division switching system of the type under consideration herein since d.c. signaling is employed. D.c. signals do not inherently indicate call direction. In a digital time-division switching system, whenever two space-division paths seek to incorporate one or more crosspoints simultaneously in a given time slot, one path may be said to "block" the other. It is desirable to minimize or eliminate "blocking" so that calling paths may be established without delay which might otherwise degrade service. Blocking becomes more significant as the volume of traffic through the switching systems under consideration increases.

Prior art systems typified by Inose, while effecting network economies in terms of control memory networks, encounter blocking as a result of crosspoint sharing and possible symmetric path coincidence conflicts of the type described above.

One prior art method for solving the blocking problem is to increase network redundancy. Theoretically, if enough switches are always idle and available for call setup, blocking could be eliminated. As a practical matter, however, the cost of a network providing enough redundancy to eliminate blocking would be prohibitive.

Another prior art solution to the blocking problem is to remove from the set of possible paths through the network any path which could have a symmetric mate coincident with such path at any point. This approach to solving the blocking problem obviously eliminates many potential communications paths from service. Such an approach is not feasible, particularly in high-traffic situations where potential communications paths are at a premium.

It is one object of the present invention to eliminate the described blocking problem while simultaneously minimizing the amount of control memory required for call setup and processing, while reducing redundancy and increasing the number of paths available for service in a time-division switching system.

It is another object of this invention to efficiently utilize crosspoint switching networks in mirror-type switching systems.

It is a further object of this invention to provide a simplified arrangement for selecting or "hunting" for paths through a time-division switching system.

It is still another object of this invention to reduce the overall cost of time-division switching networks.

So-called interleaved memories are found in the prior art and are typified by the memories used in the IBM 360/75. Typically, interleaved control memories are organized such that the memory words are divided into two groups. The first group consists of words with odd-number addresses and the second group consists of words with even-number addresses. A primary feature of an interleaved memory is the ability to provide as output a pair of data words at substantially the same time. Typically, the pair consists of the contents of an odd-numbered addressable word and the contents of an even-numbered addressable word.

In addition to retrieving a given pair of data words in a single memory cycle, an interleaved memory system can cause the data retrieved to be steered to one of two output leads (or sets of leads for multibit words) from the memory. Thus, for example, at a first time the odd-numbered word retrieved may be steered to a first output of the control memory and the even-numbered word may be steered to a second output. At some other time the given words may be steered to the outputs in a reverse manner, i.e., the even-numbered word may be steered to output 1 and the odd-numbered word may be steered to output 2.

SUMMARY OF THE INVENTION

The foregoing objects of the invention are realized in an illustrative embodiment in a time-division multiplex communications system and associated method wherein interleaved control memories are utilized to control symmetric pairs of switching modules in an implementation of a variation of a mirror-image call processing system.

Mirror-image call processing, described in the Inose patent referred to above, requires that oppositely directed symmetric (mirror-image) paths be utilized for bilateral communications. In accordance with this invention, an additional feature is included in call processing. In particular, oppositely directed symmetric paths are processed in mutually exclusive time slots, thereby precluding the blocking problem described hereinbefore. This mutually exclusive time slot call processing of mirror-image paths is termed "slipped"-mirror-image control. Even where a path and its symmetric mate are coincident, no blocking can possibly occur when using slipped-mirror control because the coincident paths do not require the use of the same equipment simultaneously.

Consequently, neither path elimination nor network redundancy is required to prevent blocking where the slipped-mirror-image call processing method is employed.

The organization of the interleaved control memory is especially well suited for implementing the present slipped-mirror-image call processing apparatus and method. For example, the ability to fetch pairs of data words in a single memory cycle permits two bidirectional calls to be partially set up during a given time slot. Fetching the same pair of data words during another time slot and appropriately steering the outputs permits the symmetric mate paths for the two partially completed calls to be set up. Thus, with only two memory accesses, four paths for two bidirectional calls may be maintained under the control of an interleaved memory.

Thus, a typical implementation of the slipped-mirror apparatus and method utilizing interleaved control memories features a total nonblocking capability while simultaneously minimizing the amount of control memory required for call processing. Also, network redundancy is eliminated while the number of bidirectional calling paths available for service in the switching system is not reduced.

Furthermore, the invention features efficient utilization of space-division networks of the crosspoint array variety.

Still further, the invention features a simplified path hunt arrangement since whenever one path through the network is established, the symmetric, unblocked path for completing the bilateral path is known.

Additionally, the invention features the use of interleaved control memories to effect network economies in a time-division switching network.

DETAILED DESCRIPTION

Figure 1:
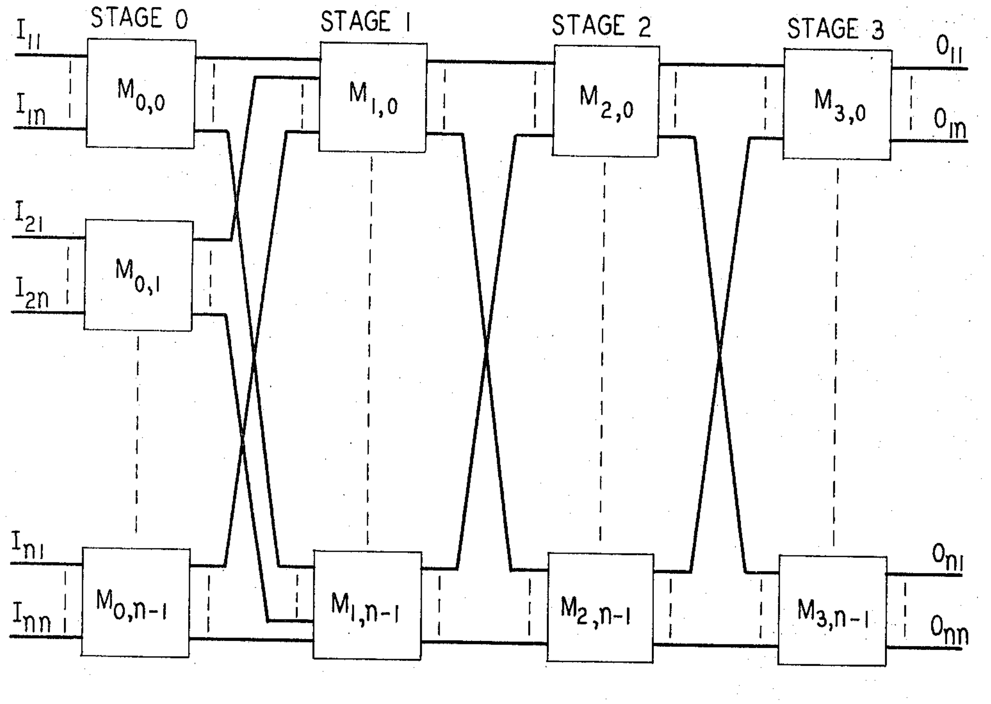
FIG. 1 PRIOR ART
FIG. 1 depicts a typical prior art four-stage space-division network.

The general topology of a prior art space-division network is shown in FIG. 1. To facilitate an understanding of the invention, a four-stage network consisting of n switching modules in each stage is shown. Module $M_{i,k}$ is located in stage $i$, at horizontal level $k$ where $i=0,1,2,2$ and $k=0,1,\ldots n-1$. $n$ is the number of input leads for each module. Thus, the network has $n^2$ input leads, designated $I_{11}, I_{12}, \ldots, I_{nn}$ in FIG. 1, each of which may be connected to one of $n^2$ data output leads, $\mathbf{0}_{11}, \mathbf{0}_{12}, \ldots, \mathbf{0}_{nn}$ via the switching modules.

Although a four-stage network is presented, it is understood that any even number of stages may be used in accordance with this invention.

Each of the modules depicted in FIG. 1, comprises a plurality of switching devices or crosspoints for interconnecting selected inputs to desired outputs. Such modules may, for example, assume the form shown in FIG. 1A of U.S. Pat. No. 3,573,381, issued to M. J. Marcus on Apr. 6, 1971.

When operated in a time-division mode (as in the Inose and Marcus systems) the connection between any two lines on opposite sides of the four-stage network is completed during short, rapidly recurring intervals called time slots. To complete a path through the space-division network, one crosspoint in each stage has to be closed to connect the switching modules. Each completed path must be established during a predetermined time slot interval so that data arriving at one side of the network during the predetermined interval can be routed through the network without being delayed or lost. The predetermined intervals for path maintenance referred to above may be established by utilizing control memory techniques now well known by those skilled in the art.

Figure 2:
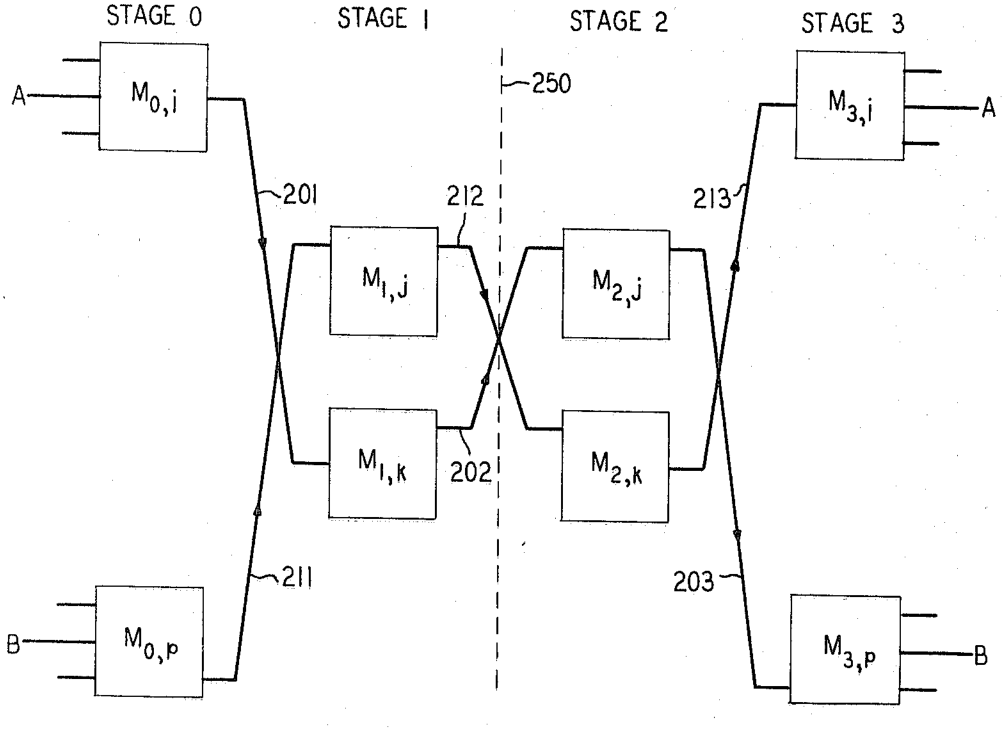
FIG. 2 PRIOR ART
FIG. 2 illustrates the interconnections required to link two subscribers in a space-division network of the type depicted in FIG. 1.

FIG. 2 displays the paths that are used for a typical two-way telephone call between subscribers A and B in a four-stage space-division network of the type shown in FIG. 1. It is assumed that the network is unilateral. Thus two separate paths must be set up for each call. In FIG. 2 one path forms the A-to-B connection (links 201, 202 and 203) and the other path forms the B-to-A connection (links 211, 212 and 213). The paths have been chosen to be symmetric with respect to vertical line 250. This symmetric property may be utilized to effect network economies in accordance with this invention as described below.

Figure 3:
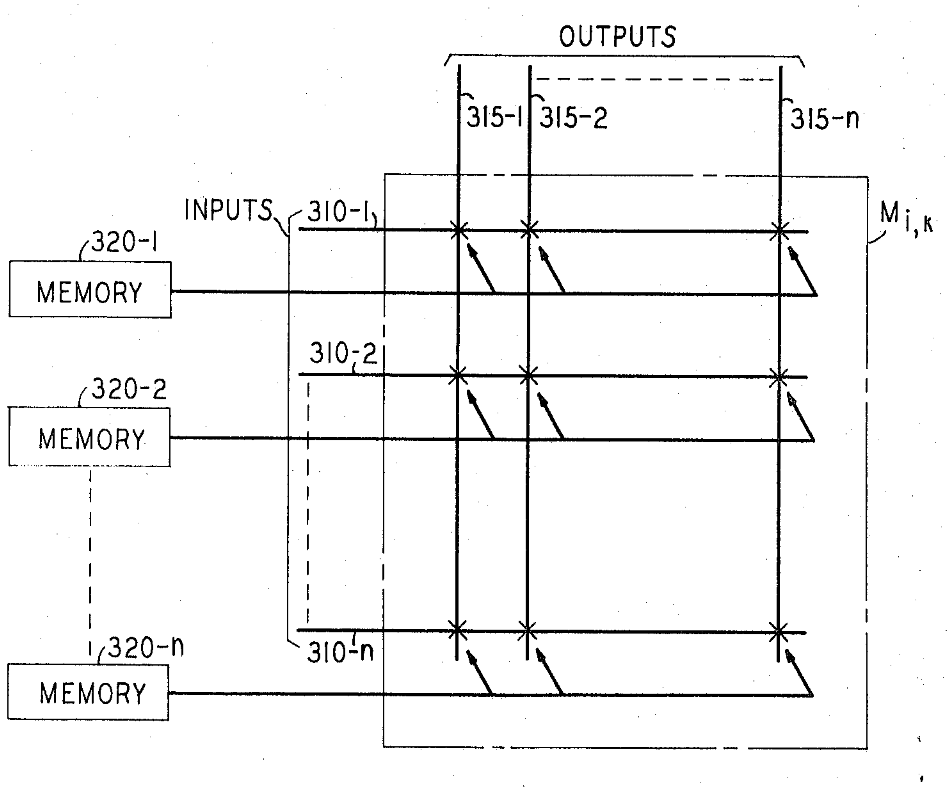
FIG. 3 PRIOR ART
FIG. 3 depicts a prior art nxn switching module under the control of conventional control memories.

FIG. 3 depicts a typical $n \times n$ switching module $M_{i,k}$, and their connections to the $n$ conventional memories, **320-*i*, ($i = 1,2,...n$). Each memory is associated with one input line, 310-*i*, ($i = 1,2,...n$), and this memory determines which output, if any, is to be connected to the given input line. For example, memory 320-1 is associated with input line 310-1 and determines which, if any, of output lines 315-1 through 315-*n* is to be connected to input line 310-1.** Different paths may be established through the space-division network during each time slot. Thus, each conventional control memory has as many words as there are time slots for selecting input/output line pairs.

H. Inose et al. U.S. Pat. No. 3,461,242, hereby incorporated by reference, disclosed a switching system in which a single control memory output influences the operation of corresponding matrix crosspoints in opposite halves of a network during a given time slot. This switching arrangement, sometimes called a mirror-image network, has the advantage that two switching modules may be controlled by the same information in a single control memory where the modules controlled are symmetric mates. other descriptions of time-division multiplex systems illustrating symmetry (or mirror-image) properties which descriptions are also hereby incorporated by reference are U.S. Pat. No. 3,740,483 issued June 19, 1973 to T. J. Pedersen and U.S. patent applications Ser. No. 243,640 filed Apr. 13, 1972 and Ser. No. 317,657 filed Dec. 22, 1972 by T. J. Pedersen.

It should be noted that, although a substantial savings in control memory requirements is effected by mirror-image control, not all symmetric pairs of communications paths may be utilized under mirror-image control. Only symmetric paths that do not coincide may be utilized. For example, consider the symmetry which exists in the two paths shown in FIG. 2. Notice that respective ones of paired links 201 and 213, 202 and 212, and 203 and 211 are symmetric with respect to line 250. If one path, for example the A-to-B path (links 201, 202 and 203), is known, the other path (symmetric mate path) is also known. Note also that no two links which form the bidirectional path are coincident at any crosspoint. This lack of coincidence (at crosspoints) does not exist in all prior art systems or, in fact, in any such system for particular paths.

Figure 4:
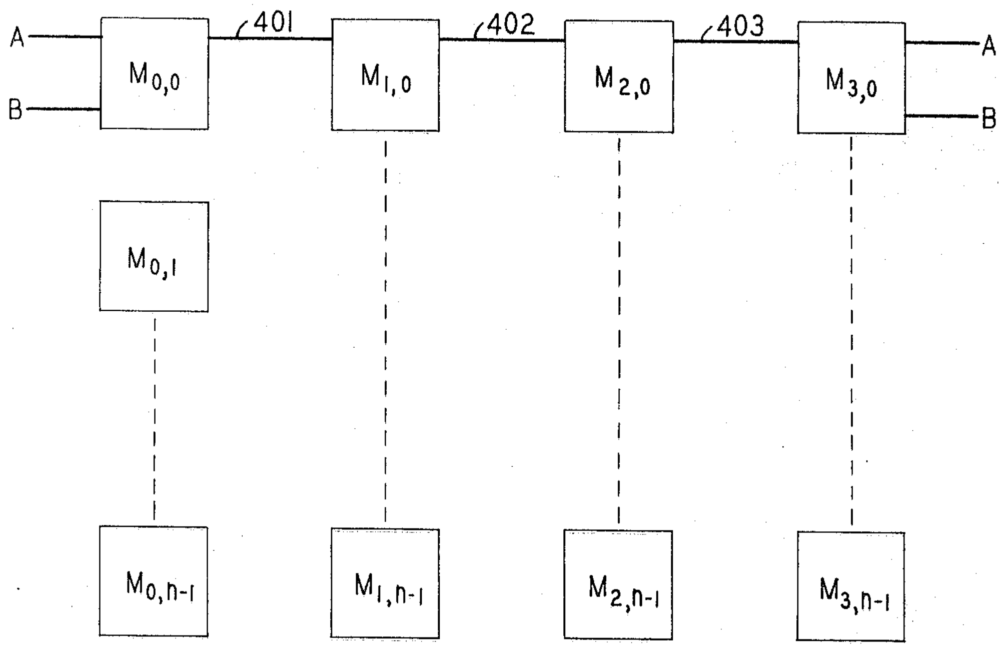
FIG. 4 depicts the coincidence problem in a network of the type depicted in FIG. 3.

For example, FIG. 4 depicts a case where the symmetric mate of a path, the path created by connecting links 401, 402 and 403, is the path itself. Clearly, as explained above, the same path cannot be used for both the A-to-B and B-to-A connections during the same time slot in a digital time-division switching system. Note, however, the same path could be used for both connections if the path also were utilized to connect data from A to B during one time slot and from B to A during a mutually exclusive time slot.

In accordance with the present invention, one path (of a bidirectional pair) is maintained in a first time slot and the symmetric mate of that path is maintained in a mutually exclusive time slot. This is the key to slipped-mirror-image control.

Prior to the description of how the slipped-mirror-image call processing method is to be implemented, a brief description of interleaved control memories utilized in the preferred embodiment of this invention will be presented.

Figures 5, 6:
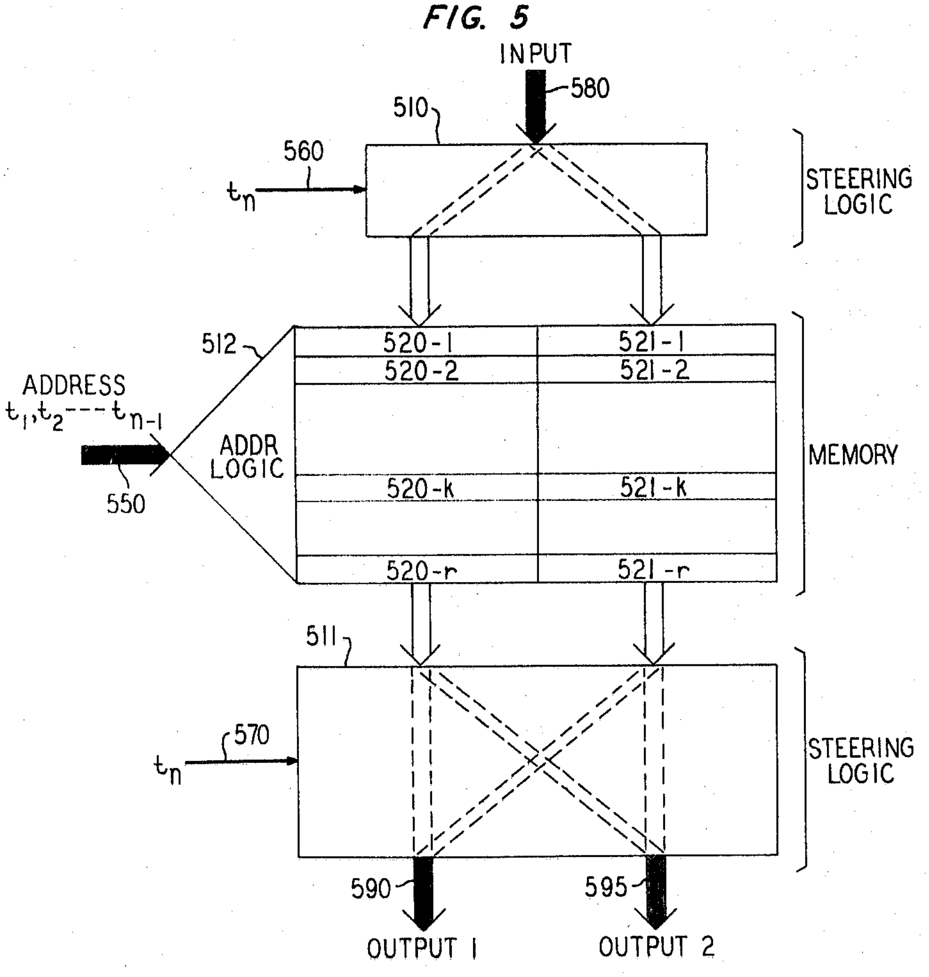
FIG. 5 depicts an interleaved control memory suitable for use in accordance with the present invention.
FIG. 6 depicts the relationship between the address values and memory locations of data appearing at the outputs of an interleaved control memory of the type depicted in FIG. 5.

FIG. 5 depicts an interleaved control memory suitable for use in accordance with this invention. As stated above, the IBM 360/75 memory is an example of an interleaved control memory which is suitable for such use. The memory comprises input steering logic 510, output steering logic 511, address decoder logic 512 and two groups of memory words. The first group of words are those located in the left-hand portion of each memory location and displayed as **520-1, 520-2,...,520-*r*, and the second group of words are those located in the right-hand portion of each location and displayed as 521-1, 521-2,...,521*r***.

As indicated above, a chief property of this memory organization is the ability to simultaneously read one word stored in an even location and one word stored in an odd location. This corresponds to reading simultaneously, a word from each of the groups set out above.

The memory operates in the following manner. Assume $T = t_1t_2t_3...t_n$ is the $n$ bit address supplied to the memory. The first $n-1$ of these bits is supplied on lead 550 to memory address decoding logic 512 to select the memory location. Bit $t_n$ is supplied to input steering logic 510 on lead 560 and to output steering logic 511 on lead 570. The function of input steering logic 510 is to route the input data appearing on lead 580 to the left half or the right half of a given location depending on the value of $t_n$. For example, if $t_n$ is "one", the address is of the right half of the given location. The function of output steering logic 511 is to route one word from the left half and one word from the right half of a given memory location to the appropriate output, output 1 or output 2, on leads 590 and 595, respectively. If $t_n$ is 0, a word selected from the left half of a given location is routed to output 1 and the word selected from the right half of the memory location is routed to output 2. When $t_n$ is 1, a word selected from the left half of a given location is routed to output 2 and data from the right half is routed to output 1. FIG. 6 shows the relationship between the value of the address and the words appearing at each of the two outputs. Note that the $n$-bit address word may assume any of $2^n$ values (0 through $2^n-1$), but that only $2^{n-1}$ memory locations are addressed.

The manner in which slipped-mirror-image call processing utilizing interleaved memory control is implemented will now be discussed in greater detail. The current practice in telephone system operation on a time-division basis is to assign each call to a common path for an extremely short but rapidly recurring interval. As noted above, these recurring intervals are defined to be time slots and they are assumed to be numbered 1 through $n$ and are each of equal duration during each repetitive signal frame. Thus, for example, time slot 1, of signal frame 2, follows immediately time slot $n$ of signal frame 1, and so forth.

Time slot numbers are typically used to address the prior art control memories. This is no less the case when the control memories are chosen to be of the interleaved variety. The contents of each memory word is indicative of which crosspoint in a given switching module is to be closed during the time slot associated with the memory word address. The two outputs of the interleaved control memory during a given time slot are used to control two different sets of crosspoints. Thus, using an interleaved control memory four communication paths over two time slots may be set up for two bidirectional calls with only two memory accesses.

Figure 7:
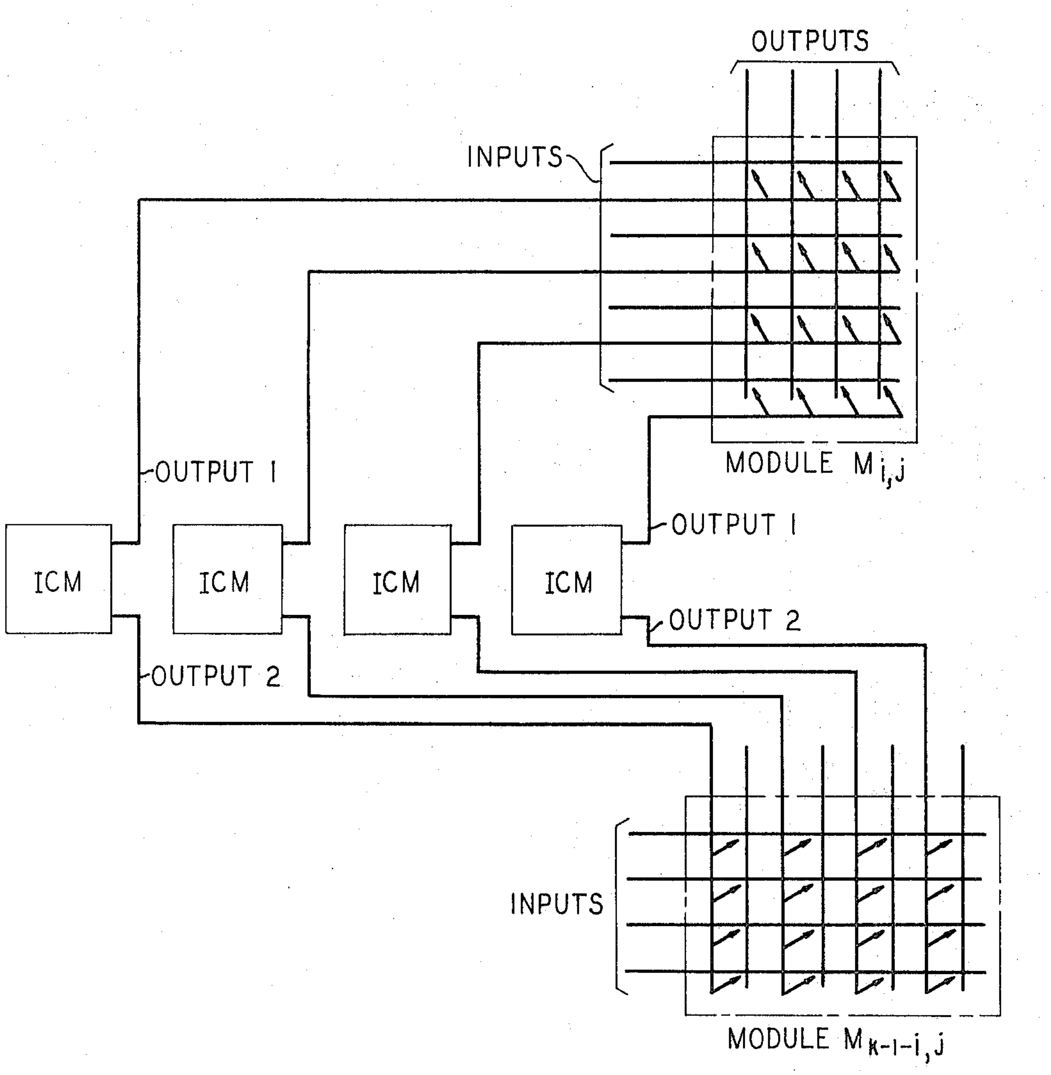
FIG. 7 depicts interleaved control memories used to implement slipped-mirror control in a network in accordance with the present invention.

The control structure of overall prior art mirror image networks must be modified, however, to effect slipped control. Specifically, in a network like that shown in FIGS. 1 and 2, module $M_{i,j}$ and module $M_{k-i-1,j}$ (where $k$ is the number of switching states and $i$=0,...,$k$−1 $j$=0,...$n$−1) must be controlled by the same control memory. In other words, symmetric modules must be controlled by the same control memory. FIG. 7 shows such a control structure where the modules shown are assumed to be 4×4 switches. Notice that if the same control memory is used to select a crosspoint in both modules, the memory determines which output is to be connected to a given input in module $M_{i,j}$ and which input is to be connected to a given output in module $M_{k-1-i,j}$. Modules like $M_{i,j}$ are defined to be controlled by input. Modules like $M_{k-1-i,j}$ are defined to be controlled by output.

The implementation of the slipped-mirror image strategy begins by having all modules on one half of the network shown in FIG. 2 being controlled by input and all modules on the other half of the network being controlled by output. This will allow for control memory sharing in the manner depicted by FIG. 7. Again, each interleaved control memory must be connected to a pair of symmetric switching modules where one of the modules is input controlled and the other module is output controlled. FIG. 7 depicts such a connection showing the connection of output 2 of each of the interleaved control memories of the type displayed in FIG. 5 to module $M_{k-1+i,j}$ and the connection of output 1 of each of the memories to modules $M_{i,j}$.

The interleaved control memories connected in the above-described manner throughout the space-division network perform the "slipping" required to set up mutually exclusive bidirectional calling paths. The details of this slipping will be presented below following certain assumptions which will be made for the purposes of illustration.

It will be assumed that whenever the first path of a particular bidirectional call is to be maintained that this first path is to be maintained during time slot $p$ where $p$ is an even number. Furthermore, it is to be assumed that the symmetric mate path to this first path is to be maintained in adjacent time slot $p$+1. It is to be understood, however, that the time slots for maintaining a bidirectional call according to this invention are not restricted to those that are adjacent. The key requirement here is that the time slots be mutually exclusive.

The manner in which the use of interleaved control memories achieves the desired slipping will now be described further. Refer also to FIG. 5 and the description of interleaved memory operation, set out above. When memories are to be used in controlling a time-division switching network, such as that described in the above-cited Inose patent, it is common practice to cycle through the memory contents during each frame. Customarily, one memory location is accessed during each time sot. The information read out is then used to select appropriate crosspoints to complete the talking paths during successive time sots. It is now well known that a single memory may be used to control both of the symmetrical paths in a bidirectional network. When a memory of the type shown in FIG. 5 is adapted for use in implementing a control function in a time-division system, a somewhat different operation sequence is employed. It is assumed that the interleaved control memory is accessed in response to a sequence of addresses associated with the cycle of time slot numbers.

During time slot $p$ data word 520-$p$ will appear at output 1 of the interleaved control memory controlling a first switching module. During time slot $p$+1, word 520-$p$ will appear at output 2 of the memory controlling a second switching module. The second switching module is arranged to be the symmetric mate of the first switching module just as in prior art systems. Thus, the control memory holds data word 520-$p$ over time slots $p$ and $p$+1 for the control of the switching modules associated with the first calling path and its symmetric path. Hence, the paths for a first bidirectional call are established. Similarly, data word 521-$p$ will appear at output 2 of the interleaved control memory during time slot $p$ controlling the second switching module. During time slot $p$+1 word 521-$p$ will appear at output 1 and thus control the first switching module. Hence, word 521-$p$ is also buffered over time slots $p$ and $p$+1 to control the symmetric oppositely directed paths of a second bidirectional call.

Notice also that only two memory accesses are required to establish both bidirectional calls, the data words being steered to the appropriate memory outputs in the appropriate time slots according to the chart in FIG. 6.

In short, still referring to FIG. 6, the information which is supplied to module $M_{i,j}$ (from output 1) in time slot $p$ is supplied to module $M_{k-1-i,j}$ (from output 2) in time slot $p$+1, completing a first bidirectional call. The control information delivered to module $M_{k-1-i,j}$ during time slot $p$ is delivered to module $M_{i,j}$ in time slot $p$+1, completing the second bidirectional call.

Thus, interleaved control memories may be utilized to implement slipped-mirror-image control in a time-division multiplex network. All of the control information required to setup the four paths for two bidirectional calls through the network appears at outputs 1 and 2 of the interleaved control memory in time slots $p$ and $p$+1. Furthermore, the oppositely directed symmetric paths for each bidirectional call may be coincident since the paths are set up in mutually exclusive time slots.

Figure 8:
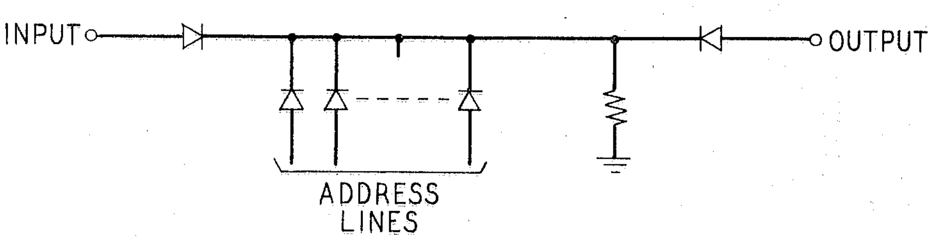
FIG. 8 depicts a bilateral crosspoint useful in the practice of this invention.

FIG. 8 depicts a crosspoint that may be used in accordance with this invention. It is important to note that the crosspoint is bilateral since the data signal can be transmitted in either direction through the crosspoint. Thus, if a switching module is constructed with such crosspoints, a module controlled by input or a module controlled by output can be obtained simply by interchanging those wires which are connected to the inputs and those wires connected to the outputs, as would be obvious to those of ordinary skill in the art. Thus, the input-controlled and output-controlled switching modules described above may be easily obtained.

Although the invention has been described in the context of a four-stage time-division switching system, it is to be understood that the arrangement applies to switching systems with $n$ stages so long as $n$ is even. Furthermore, it is to be understood that the elements disclosed in the specific embodiment described are illustrative only and that other components, for example Marcus crosspoints, may be utilized in place of components disclosed in the illustrative embodiment.

The above-described invention clearly minimizes the amount of control memory required for call setup in a time-division multiplex network while providing a maximum number of paths through the network. Neither redundancy nor path elimination is required.

Numerous other arrangements may be divised by those skilled in the art without departing from the scope and spirit of the invention. For example, an arrangement in which the time slots for setting up bidirectionalcalls are non-adjacent may be implemented by accessing the appropriate interleaved control memory word during regularly predetermined time slot intervals, such as every other time slot.

What is claimed is:

1. Apparatus for establishing and maintaining a plurality of bidirectional time-division multiplexed communication paths comprising A. a first ordered plurality of time-division switching crosspoints for establishing connections in a first direction for each of two bidirectional paths, B. a second ordered plurality of time-division switching crosspoints, not necessarily mutually exclusive of said first plurality of switching crosspoints, for establishing connections in the second direction of said bidirectional paths, each of said second plurality of switching crosspoints bearing a symmetrical relation to one of said first plurality of switching crosspoints, and C. control means for selectively interconnecting said first plurality of switching crosspoints during a first time slot and for selectively interconnecting said second plurality of switching crosspoints during a second time slot, said first and second time slots being mutually exclusive but not necessarily contiguous.

2. Apparatus according to claim 1 wherein said control means comprises 1. first means for generating a sequence of repetitive address signals during each time-division frame, 2. second means responsive to said address signals for generating first and second sequences of control signals, said second sequence comprising the same set of signals as said first sequence except for the ordering of said sets of signals.

3. Apparatus according to claim 2 wherein said second means comprises memory means storing a plurality of words, and means for reading two sequences of signals from said memory means, said means for reading comprising means for reading in said first sequence a first word of a pair of words during said first time slot and a second word during said second time slot, and means for reading in said second sequence said second word during said first time slot and said first word during said second time slot.

4. Apparatus according to claim 3 wherein said means for reading comprises means for reading said first and second words in said first and second sequences during consecutive time slots.

5. Apparatus according to claim 4 wherein said memory means comprises a plurality of locations, each capable of storing two of said words, and said means for reading comprises means for reading the contents of each location during each of two consecutive time slots.

6. Apparatus according to claim 5 wherein each of said switching crosspoints is part of a separate switching matrix and wherein said memory means comprises a plural location memory for each pair of said switching matrices, which pair of switching matrices comprises one of said first plurality of crosspoints and its symmetrical mate in said second plurality of switching crosspoints.

* * * * *